(12) United States Patent
Herger et al.

(10) Patent No.: US 12,423,601 B2
(45) Date of Patent: Sep. 23, 2025

(54) SYSTEMS AND METHODS FOR ANALYSIS EXPLAINABILITY

(71) Applicant: Thomson Reuters Enterprise Centre GmbH, Zug (CH)

(72) Inventors: Nadja Herger, Thalwil (CH); Nina Stamenova Hristozova, Langnau Am Albis (CH); Milda Norkute, Zurich (CH); Leszek Michalak, Zug (CH); Stavroula Skylaki, Zug (CH); Daniele Giofré, Tolochenaz (CH); Andrew Timothy Mulder, Orleans (CA)

(73) Assignee: Thomson Reuters Enterprise Centre GmbH, Zug (CH)

( * ) Notice: Subject to any disclaimer, the term of this patent is extended or adjusted under 35 U.S.C. 154(b) by 1014 days.

(21) Appl. No.: 17/484,881

(22) Filed: Sep. 24, 2021

(65) Prior Publication Data

US 2022/0092453 A1    Mar. 24, 2022

Related U.S. Application Data

(60) Provisional application No. 63/082,779, filed on Sep. 24, 2020.

(51) Int. Cl.
| | | |
|---|---|---|
| G06F 17/00 | (2019.01) | |
| G06F 16/23 | (2019.01) | |
| G06N 5/045 | (2023.01) | |

(52) U.S. Cl.
CPC ......... *G06N 5/045* (2013.01); *G06F 16/2379* (2019.01)

(58) Field of Classification Search
CPC .... G06F 16/2379; G06F 40/35; G06F 40/284; G06F 16/345; G06F 40/166; G06N 5/045;
(Continued)

(56) References Cited

U.S. PATENT DOCUMENTS

| | | | |
|---|---|---|---|
| 8,819,001 B1 * | 8/2014 | Zhang ................. | G06F 16/3346 707/723 |
| 12,086,851 B1 * | 9/2024 | Arici .................. | G06Q 30/0631 |

(Continued)

OTHER PUBLICATIONS

Patent Cooperation Treaty, International Search Report and Written Opinion issued for PCT Application No. PCT/IB2021/058745, dated Jan. 14, 2022, 12 pages.
(Continued)

*Primary Examiner* — Jason T Edwards
(74) *Attorney, Agent, or Firm* — Norton Rose Fulbright US LLP

(57) ABSTRACT

Methods and systems for providing mechanisms for presenting artificial intelligence (AI) explainability metrics associated with model-based results are provided. In embodiments, a model is applied to a source document to generate a summary. An attention score is determined for each token of a plurality of tokens of the source document. The attention score for a token indicates a level of relevance of the token to the model-based summary. The tokens are aligned to at least one word of a plurality of words included in the source document, and the attention scores of the tokens aligned to the each word are combined to generate an overall attention score for each word of the source document. At least one word of the source document is displayed with an indication of the overall attention score associated with the at least one word.

20 Claims, 5 Drawing Sheets

(58) Field of Classification Search
CPC .......... G06N 20/00; G06N 3/04; G06N 3/08; G06N 3/045
USPC .......................................................... 706/53
See application file for complete search history.

(56) References Cited

U.S. PATENT DOCUMENTS

| | | | | |
|---|---|---|---|---|
| 2003/0217360 | A1* | 11/2003 | Gordon | H04N 21/4348 348/E7.063 |
| 2014/0162243 | A1* | 6/2014 | Lamkin | G09B 5/08 434/365 |
| 2018/0018553 | A1* | 1/2018 | Bach | G06F 40/279 |
| 2018/0365321 | A1* | 12/2018 | Ke | G06F 40/284 |
| 2020/0065374 | A1* | 2/2020 | Gao | G06N 3/08 |
| 2020/0167391 | A1* | 5/2020 | Zheng | G06F 16/3347 |
| 2020/0341974 | A1* | 10/2020 | Bowden, Jr. | G06F 16/24573 |
| 2021/0192126 | A1* | 6/2021 | Gehrmann | G06N 20/00 |
| 2021/0383127 | A1* | 12/2021 | Kikin-Gil | G06V 10/811 |

OTHER PUBLICATIONS

See, A. et al. "Get to the Point: Summarization with Pointer-Generator Networks," Proceedings of the 55th Annual Meeting of the Association for Computational Linguistics, Apr. 2017, 20 pages.

Baan, J. et al. "Do Transformer Attention Heads Provide Transparency in Abstractive Summarization?" Proceedings of FACTS-IR, Association for Computing Machinery, Jul. 2019, 7 pages.

Gehrmann, S. et al. "Visual Interaction with Deep Learning Models Through Collaborative Semantic Inference," IEEE Transactions on Visualization and Computer Graphics, vol. 26, No. 1, Jan. 2020, 11 pages.

Bahdanau, D. et al. "Neural Machine Translation by Jointly Learning to Align and Translate," 3rd International Conference on Learning Representations, May 2015, 15 pages.

Norkute, M. et al. "Towards Explainable AI: Assessing the Usefulness and Impact of Added Explainability Features in Legal Document Summarization," CHI '21 Extended Abstracts of the 2021 Conference on Human Factors in Computing Systems, Association for Computing Machinery, May 2021, 7 pages.

* cited by examiner

FIG. 3B

SYSTEMS AND METHODS FOR ANALYSIS EXPLAINABILITY

CROSS-REFERENCE TO RELATED APPLICATIONS

The present application claims the benefit of U.S. Provisional Application No. 63/082,779 filed Sep. 24, 2020 and entitled "SYSTEMS AND METHODS FOR ANALYSIS EXPLAINABILITY," the disclosure of which is incorporated herein by reference in its entirety.

TECHNICAL FIELD

The present invention relates generally to artificial intelligence (AI) explainability, and more particularly to mechanisms for presenting AI explainability associated with model-based decisions.

BACKGROUND OF THE INVENTION

Artificial intelligence (AI), which may include machine learning (ML), has allowed current systems to automate many processes by using algorithmic or model-based decision-making. For example, in natural language processing (NLP) systems, many tasks, such as text classification, question-answering, translation, topic modelling, sentiment analysis, summarization, may be automated using AI-based models. Using AI-based models provides these systems with a powerful mechanism for automating tasks that may be impossible, or impractical, using a human.

However, balancing the powerful capabilities provided by AI with the need to design technology that people feel empowered by may be a challenge, as people may not feel in control and may not be willing or able to trust the automated decisions based on the AI-models. Moreover, decisions made by AI models may not always be accurate, and may not always be exactly or close to what a human user may decide. For example, in headline generation, an AI-based model may be used to generate a headline from an article, but the headline may not be always accurate, or may not encompass a correct summary or a complete summary of the article. In another example, such as in abstractive text summarization in which a summary of a text may be generated from the main ideas in the text, the generated summary may potentially contain new phrases and sentences that may not appear in the source text. This may cause problems, as this approach may lend itself, when the model is not sufficiently refined, to inaccuracies in the summaries. Here is where AI explainability may help.

AI explainability refers to a range of techniques, algorithms, and methods, which may accompany model-based outputs with explanations. AI explainability seeks to help increase the trust by users of the AI model-based decisions by providing information that may help explain how the AI models arrived at those decisions, and may provide the user with a means for verifying the information or understanding how the decision was made.

BRIEF SUMMARY OF THE INVENTION

Aspects of the present disclosure provide systems, methods, and computer-readable storage media that support mechanisms for presenting AI explainability metrics associated with model-based results. The systems and techniques of embodiments provide improved systems with capabilities to apply artificial intelligence (AI)-based models to data, obtain a summary of the data based on the model, obtain AI explainability metrics (e.g., attention scores associated with the results) from the model, and present the AI explainability metrics to users.

In one particular embodiment, a method of displaying attention scores to a user may be provided. The method may include receiving a source document to be analyzed by at least one model. In aspects, the source document includes a plurality of tokens, and the at least one model is configured to generate a summary based on content of the source document. The method further includes determining one or more attention scores for each token of the plurality of tokens of the source document. In aspects, the one or more attention scores indicates a level of relevance of an associated token to the summary generated by the at least one model. The method also includes aligning each token of the plurality of tokens to at least one word of a plurality of words included in the source document, combining, for each word of the plurality of words, attention scores of tokens aligned to the each word to generate an overall attention score for each word of the plurality of words, and displaying at least one word of the plurality of words with an indication of the overall attention score associated with the at least one word, the indication based on the overall score.

In another embodiment, a system for displaying attention scores to a user is provided. The system may include a database configured to store a source document including a plurality of tokens and a server. In aspects, the server may be configured to perform operations including receiving the source document, applying a model to the source document to generate a summary based on content of the source document, and determining one or more attention scores for each token of the plurality of tokens of the source document, aligning each token of the plurality of tokens to at least one word of a plurality of words included in the source document, and combining, for each word of the plurality of words, attention scores of tokens aligned to the each word to generate an overall attention score for each word of the plurality of words. In aspects, the one or more attention scores indicates a level of relevance of an associated token to the summary generated by the at least one model. The system also includes an input/output device configured to display at least one word of the plurality of words with an indication of the overall attention score associated with the at least one word, the indication based on the overall score.

In yet another embodiment, a computer-based tool for displaying attention scores to a user may be provided. The computer-based tool may include non-transitory computer readable media having stored thereon computer code which, when executed by a processor, causes a computing device to perform operations that may include receiving a source document to be analyzed by at least one model. In aspects, the source document includes a plurality of tokens, and the at least one model is configured to generate a summary based on content of the source document. The operations further include determining one or more attention scores for each token of the plurality of tokens of the source document. In aspects, the one or more attention scores indicates a level of relevance of an associated token to the summary generated by the at least one model. The operations also include aligning each token of the plurality of tokens to at least one word of a plurality of words included in the source document, combining, for each word of the plurality of words, attention scores of tokens aligned to the each word to generate an overall attention score for each word of the plurality of words, and displaying at least one word of the plurality of words with an indication of the overall attention score associated with the at least one word, the indication based on the overall score.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 3B is a diagram illustrating an example of attention score based highlighting in accordance with embodiments of the present disclosure.

Figure 1:
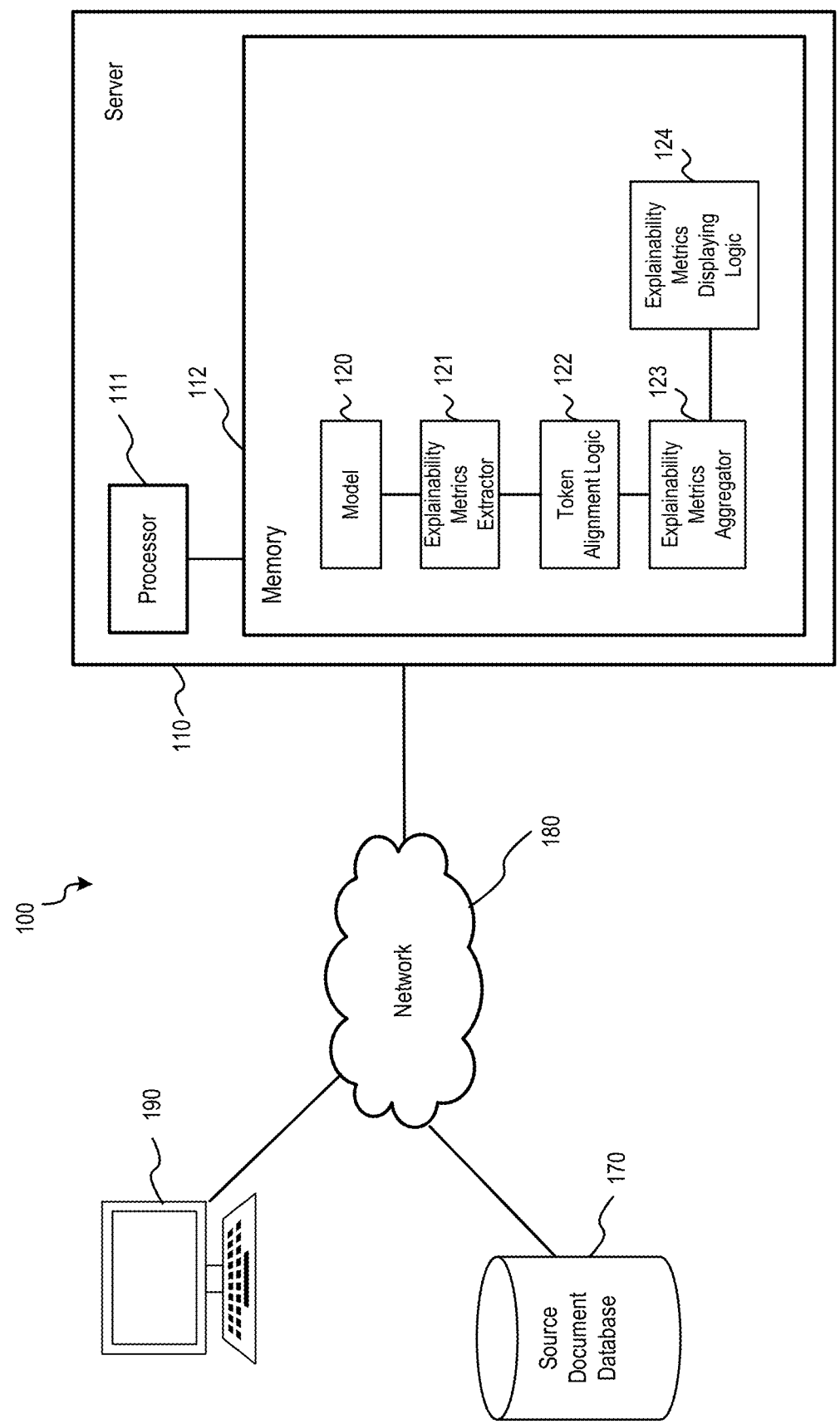
FIG. 1 is a block diagram of an exemplary system 100 configured with capabilities and functionality for providing mechanisms for presenting AI explainability metrics associated with model-based results to users in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE INVENTION

Various aspects of the present disclosure are directed to systems and techniques that provide mechanisms for presenting AI explainability metrics associated with model-based results. The systems and techniques of embodiments provide improved systems with capabilities to apply AI-based models to data, obtain results, obtain AI explainability metrics (e.g., attention scores and/or source attribution associated with the results) from the model, and present the AI explainability metrics to users. For example, in a data summarization application or a headline generation application, presenting the AI explainability metrics to users may include displaying to users an indication of which portion or portions of the source data were used or were relevant to the generated summary or headline. In embodiments, the indication may include a highlighting of the relevant portions of the source data. In some embodiments, the level of highlighting (e.g., the shade of the highlighting) may be based on the level of relevancy of the highlighted portion to the model-based results. For example, a darker highlighting of a word may indicate that the word had a high level of relevance to the model-based results (e.g., the generated summary or headline in the example above). In some embodiments, the level of relevance may be based on attention scores associated with the highlighted portions and obtained from the model used to generate the results.

As noted throughout the present application, the techniques disclosed herein configure a system to present an enhanced graphical user interface (GUI) in which AI explainability metrics associated with model-based results are presented (e.g., displayed) to a user, such that the user is provided with guidance and/or information on how the model made decisions or obtained the results. For example, a user consuming the model-based results (e.g., a summary or headline generated from a source text) may identify and review the portions of source text from which the summary or headline originated, and in this manner may verify and/or confirm the model-based results, resulting in an increased trust in the model. The result of the implementation of aspects disclosed herein is a system that is far more efficient, accurate, and faster than a system implemented without the techniques disclosed herein.

Thus, it should be appreciated that the techniques and systems disclosed herein provide a technical solution to technical problems existing in the conventional industry practice of AI-based systems. Furthermore, the techniques and systems disclosed herein embody a distinct process and a particular implementation that provide an improvement to existing computer systems by providing the computer systems with new capabilities and functionality for applying AI models to data to obtain results, extracting and/or obtaining AI explainability associated with the results, and/or presenting the AI explainability to users.

FIG. 1 is a block diagram of an exemplary system 100 configured with capabilities and functionality for providing mechanisms for presenting AI explainability metrics associated with model-based results to users in accordance with embodiments of the present disclosure. As shown in FIG. 1, system 100 includes server 110, source document database 170, and at least one user terminal 190. These components, and their individual components, may cooperatively operate to provide functionality in accordance with the discussion herein. For example, in operation according to embodiments, a dataset including one or more text sources from source document database 170 may be provided to server 110 as input (e.g., via network 180). The various components of server 110 may cooperatively operate to apply a model to the text sources to generate results, to extract or obtain AI explainability metrics associated with the results from the applied model, and to display an indication associated with the AI explainability metrics associated with the results.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

In embodiments, source document database 170 may be configured to store data to be provided to server 110 for operations according to the present disclosure. For example, source document database 170 may store data including content to which one or more AI models may be applied to obtain a results. In some embodiments, the data may include documents, files, a data stream, etc., and the content of the data may include articles, court cases, court complaints, court docket documents, news articles, blogs, social media posts, public records, published legal documents, etc. For example, in some embodiments, source document database 170 may include an online legal research database. In some embodiments, source document database 170 may include a document feed, and a document feed of an article may include a link to the article, which may be stored in a remote server. Source document database 170 may include articles from various sources. In some embodiments, source document database 170 may include data streams pumping the articles directly as an input to server 110, such as RSS feeds, live streams, etc. In other embodiments, source document database 170 may include stored articles. For example, articles may be collected and stored in source document database 170, and the stored articles may be provided to server 110 as input.

User terminal 190 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 190 may be configured to provide a GUI via which a user (e.g., an end user, and editor, a developer, etc.) may perform analysis of articles in source document database 170. As will be described in more detail below, model-based results may be presented to a user including presentation of AI explainability metrics associated with the results. As discussed in the example above and below, the output presented to the user may include the model-based results, as well as portions of the source text relevant to the model-based results including an indication (e.g., highlighting) of the level of relevance of the portions to the model-based results, as provided by server 110. Functionality of server 110 to generate and provide the output in accordance with the present embodiments will be discussed in more detail below.

Server 110, user terminal 190, and source document database 170 may be communicatively coupled via network database 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between server 110, user terminal 190, and source document database 170.

Server 110 may be configured to receive source data (e.g., documents, articles, court documents, etc.) from source document 170, to generate model-based results by applying a model to the received data, and to present AI explainability metrics associated with the model-based results to the user. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single blocks, the implementation of the components and of server 110 is not limited to a single component and, as described above, may be distributed over several devices or components.

It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

As shown in FIG. 1, server 110 includes processor 111 and memory 112. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, as noted above, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

As shown in FIG. 1, memory 112 includes model 120, explainability metrics extractor 121, token alignment logic 122, explainability metrics aggregator 123, and explainability metrics displaying logic 124. Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Model 120 may represent one or more AI-based models configured to generate results when applied to content or source text included in input data. Model 120 may represent any model, or any type of model that is configured to generate a result based on particular portions of the content. For example, a summarization model may be configured to identify relevant portions of the content (e.g., portions of the content including information related to the main idea or ideas conveyed in the content), and to generate a summary of the input data based on the relevant portions.

It is noted at this point that the discussion that follows focuses, somewhat, on a summarization model. However, this is merely for illustrative purposes and should not be construed as limiting in any way. Indeed, the techniques disclosed herein for presenting AI explainability metrics to a user may be applicable to systems implementing other types of models that generate AI explainability metadata, such as classification models, question-answering models, translation models, topic modeling models, sentiment analysis models, etc.

Typically, summarization models may be one of two prominent types, an extractive summarization model and an abstractive summarization model. An extractive summarization model may be a model that extracts words and phrases from the source text itself to create a summary. For example, where the source text includes "the quick brown fox jumps over the lazy dog," an extractive summarization model may generate a summary that includes "the quick fox jumps over the lazy dog." In contrast, an abstractive summarization model may be a model that generates a summary that is based on the main ideas of the source text, rather than the source text itself.

A summary generated by an abstractive summarization model may potentially contain new phrases and sentences that may not appear in the source text. For example, for the above example source text, an abstractive summarization model may generate a summary that includes "the fast fox hops over the lethargic dog." In this manner, an abstractive summarization algorithm more closely resembles the way humans write summaries. The abstractive summarization model identifies relevant information in the source text, and the relevant information is maintained using semantically consistent words and phrases.

In embodiments, model 120 may be previously trained based on Gold data. In this manner, model 120 may be fully trained to perform operations according to its configuration. For example, where model 120 may represent a court cases summarization model, model 120 may be previously trained with a large corpus of court cases (e.g., hundreds of thousands of court cases) and associated manually-written summaries.

In embodiments, model 120 may also be configured to generate additional metadata (e.g., in addition to the generated summary) that may include AI explainability metrics associated with the content analyzed. In particular, AI explainability metrics may include attention scores generate by model 120 for the tokens of the source text. For example, the source text may be tokenized and may include a plurality of tokens. In some embodiments, each token may represent a word in the source text, or may represent a fraction of a word, in which case a word may be broken up into more than one token.

When model 120 is applied to the source text to generate the summary, model 120 may predict the next token (e.g., word or sub-word) in the summary, as well as an attention distribution of each token in the source text with respect to each word in the summary. In order to predict the next token in the summary, a source text may be evaluated to infer how strongly the word attends to, or correlates with, other tokens in the summary taking the attention vector into account. This attention distribution may be used by model 120 to generate an attention matrix associated with the generated summary. As explained above, the attention matrix may provide insight into the importance of each token in the source text to each token in the generated summary.

In embodiments, the attention matrix may be a matrix of dimensions A×H, where A represents the number of tokens in the source text, and H represents the number of tokens in the generated summary. In this case, the attention matrix provided by model 120 provides, per token in the generated summary, a distribution of attention weights per token in the source text. In aspects, the distribution may be presented as an attention score, where a higher attention score indicates a higher relevance or importance of that token when predicting the next word in the summary. In this manner, an attention score for a particular token in the source text represents the importance and/or relevance of that particular token when generating the summary.

In embodiments, explainability metrics extractor 121 may be configured to extract AI explainability metrics from model 120, the AI explainability metrics associated with the model-based results. The AI explainability metrics extracted by explainability metrics extractor 121 may include one or more attention scores associated with each token of the source document. For example, model 120 may be applied to the source document received from source document database 170 and may generate a summary of the content of the source document and an attention matrix, as explained above. In embodiments, explainability metrics extractor 121 may be configured to receive the generated summary and the attention matrix from model 120, and to extract AI explainability metrics based on the generated summary and the attention matrix. In some embodiments, model 120 may also provide the source document as a tokenized source document. For example, explainability metrics extractor 121 may compute or calculate an average attention score for each token in the source document based on the attention matrix received from model 120. For example, explainability metrics extractor 121 may be configured to obtain an average of the attention matrix provided by model 120 along one axis (e.g., the A axis). As a result, explainability metrics extractor 121 may obtain a 1×A vector representing the averaged attention score per token in the source document. In this manner, explainability metrics extractor 121 computes an attention score for each token in the source document with respect to the generated summary.

In some embodiments, post-processing of the 1×A vector including the average attention scores per token in the source document may be performed. Post processing may include setting attention scores for any punctuation tokens in the source document to zero, as in some cases including attention scores for punctuations is not meaningful. Post process may additionally or alternatively include normalization of the attention scores to that a minimum attention score for any token in the source document is zero, and a maximum attention score for any token in the source document is one.

In embodiments, token alignment logic 122 may be configured to align each of the tokens in the source document to at least one word. For example, as mentioned above, in some cases, a token may represent an entire word, or may represent a sub-word (e.g., a fraction of a word). In the case where each token in the source document represents an entire word, and each word is represented by a single token, the token alignment may not be needed, as each token, and thus each attention score in the 1×A vector, is associated with a word of the source document. However, where at least one token of the source document represents a fraction of a word, and thus at least one word is represented by one or more tokens, token alignment may be performed by token alignment logic 122. Token alignment logic 122 may combine each sub-word associated with a word to generate the word, and may also combine the attention scores associated with each sub-word to generate a combined attention score for the generated word. For example, two tokens in the source document may include the sub-words "bi" and "ological," each with an individual attention score associated with the generated summary. These two sub-words may be combined to obtain the word "biological." In this case, the two individual attention scores, as determined by explainability metrics extractor 121, may be combined by token alignment logic 122 to obtain a combined attention score for "biological" with respect to the generated summary.

In embodiments, explainability metrics aggregator 123 may be configured to aggregate AI explainability metrics associated with each token of the source document. For example, in some embodiments, more than one AI explainability metric may be obtained and/or extracted for each token of the source document. In some cases, the AI explainability metrics may include an averaged attention score for each token (e.g., averaged over all the tokens in the generated summary), or may include more than one attention score per token in the source document. In some cases, other AI explainability metrics may be obtained for each token in the source document in addition or in the alternative to the attention score. In these cases, all the AI explainability metrics obtain for each token in the source document may be aggregated per token by explainability metrics aggregator 123, such as by averaging the AI explainability metrics.

In aspects, explainability metrics aggregator 123 may be configured to aggregate AI explainability metrics per page of the source document. For example, explainability metrics aggregator 123 may be configured to determine, for a given page of the source document, an average attention score for the page based on the individual attention scores of each token contained within the page. In some embodiments, explainability metrics aggregator 123 may average the attention scores of all the tokens within a page of the source document to obtain the attention score associated with the page. In some cases, a binary attention score is used. In this case, if any token within a page is identified as relevant to the generated summary, a page where the token is contained is also identified as relevant and is given the attention score of the token.

In embodiments, explainability metrics displaying logic 124 may be configured to present the AI explainability metrics of each word of the source document associated with the generated summary to a user or users. For example, explainability metrics displaying logic 124 may generate and/or display a highlight over each word of the source document indicating the AI explainability metric associated with each word. The highlighting may be displayed on the tokenized source document provided by model 120. In some embodiments, the opacity of the highlighting over a word may be based on the attention score of the word. For example, a darker highlight over a first word of the source document may indicate a higher attention score than a lighter highlight over a second word of the source document. In this manner, a darker highlight over a word may indicate that the word is more important for the resulting summary than a word with a lighter highlight (e.g., a darker highlight over a word may indicate that more attention was paid by model 120 to the highlighted word when predicting a next word in the generated summary than the attention paid to a word with a lighter highlight). In some aspects, explainability metrics displaying logic 124 may display no highlighting over a token with an attention score that is less than a threshold value.

It will be appreciated that the functionality of explainability metrics displaying logic 124 to present the AI explainability metrics of the various words of the source document with respect to the generated summary to a user may result in a significantly easier process for verifying the generated summary by the user.

Figure 2:
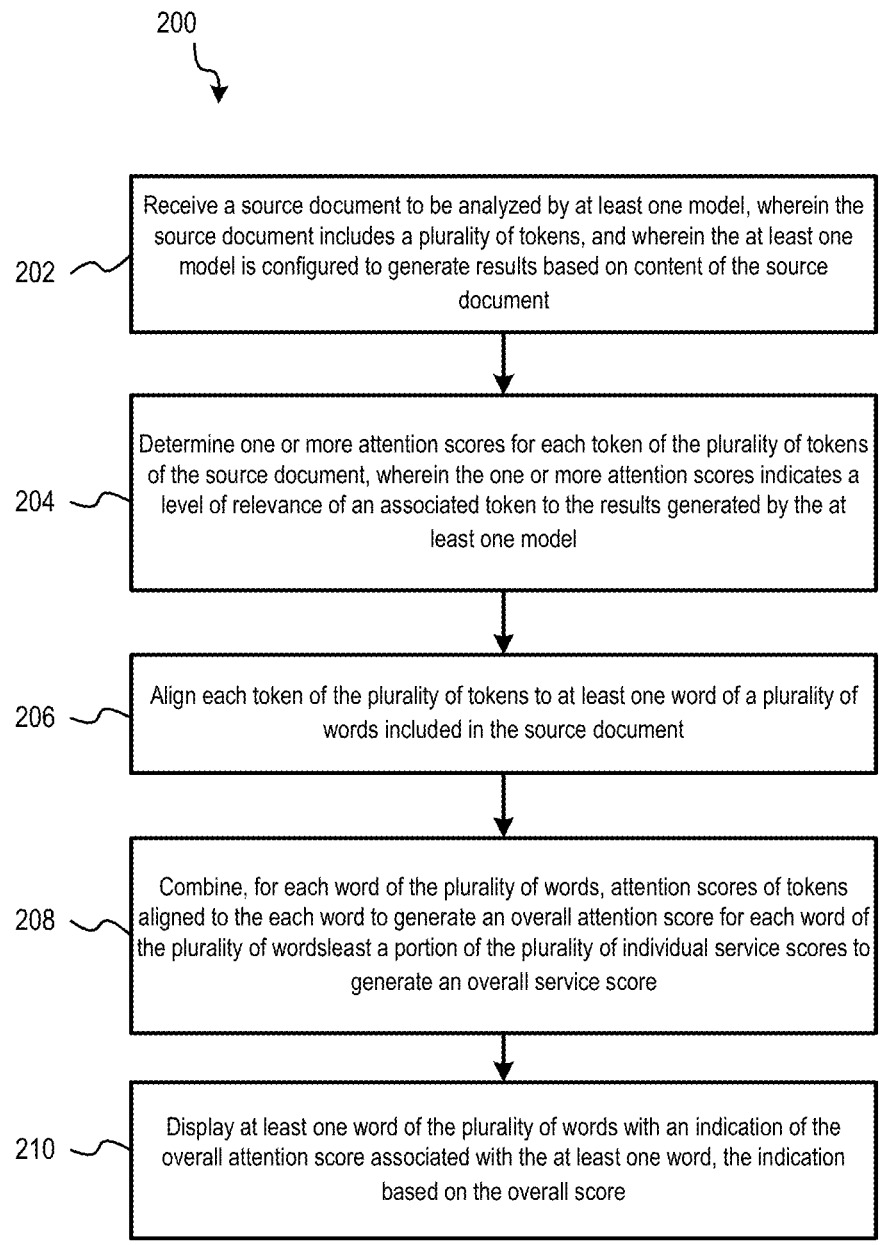
FIG. 2 shows a high level flow diagram of operation of a system configured in accordance with aspects of the present disclosure for providing mechanisms for presenting AI explainability metrics associated with model-based results in accordance with embodiments of the present disclosure.

FIG. 2 shows a high level flow diagram 200 of operation of a system configured in accordance with aspects of the present disclosure for providing mechanisms for presenting AI explainability metrics associated with model-based results in accordance with embodiments of the present disclosure. For example, the functions illustrated in the example blocks shown in FIG. 2 may be performed by system 100 of FIG. 1 according to embodiments herein.

In general terms, embodiments of the present disclosure provide functionality for providing model-based results to a user that go beyond current capabilities, which may not always be trusted by users, as the models operations may remain a mystery to the user. As has been noted above, the current impetus in AI is to move towards more complex models. However, these complex models may not be fully trusted by users precisely because of their complexity. Embodiments of the present disclosure allow for the presentation of AI explainability metrics associated with model-based results. The presentation of the AI explainability metrics according to embodiments is user-friendly, simplified, and comprehensive, allowing a user to easily leverage the AI explainability metrics to verify the model-based results, thereby increasing their trust in the model. Therefore, Applicant notes that the solution described herein is superior, and thus, provides an advantage over prior art systems.

One application of the techniques and systems disclosed herein may be in a summarization environment. As noted above, summarization may involve extracting a summary (e.g., an extractive and/or an abstractive summary) from the source document. Summarization may be especially useful in applications where source documents may include long passages of text data. In some cases, only certain portions of the data in a document may be relevant to the summary. For example, in one specific example, a source document may be a court complaint. Typically, summarizing the court complaint may include an editor manually generating the complaint summary. In these typical cases, the editor may generate a complaint summary that includes the relevant data, such as the names of the plaintiffs and defendants, a case caption, and summaries of the allegations and damages for the case. An allegations summary conveys the central thrust of the lawsuit in just a few sentences, and damages reflect the prayer for relief that the plaintiff has put forward. Although the information necessary for creating the complaint summary is included in the complaint document, the complaint document may range anywhere from a few pages to a hundred pages. Typically, an editor follows some guidelines on how this data must be entered in the complaint summary, but the editor must look through the document identifying the required information. However, in aspects according to embodiments of the present disclosure, AI summarization models may be used to generate the summaries automatically, and AI explainability metrics may be presented to the user that provide an insight into how the AI summarization model generated the complaint summary. The user may then verify the complaint summary based on the presentation of the AI explainability metrics.

At block 202, content to be analyzed by at least one model is received. For example, a source document may be received by a server (e.g., server 110 of FIG. 1). The source document may contain source text. In embodiments, the source document may be tokenized and may include a plurality of tokens. Each token of the plurality may be associated with a word or with a sub-word of the content. The at least one model may be configured to generate results based on the content. In some embodiments, the model may be a summarization model configured to generate a summary of the content of the source document.

At block 204, one or more attention scores are determined for each token of the plurality of tokens of the content. The one or more attention scores may indicate a level of relevance of an associated token to the results generated by the model. For example, the model applied to the source document to generate the results may additionally or alternatively generate AI explainability metrics associated with each token of the plurality of tokens in the source document. For example, the at least one model may generate an attention matrix associated with the generated summary. The attention matrix may provide insight into the importance of each token in the source document with respect to each token of the generated summary.

Figure 3A:
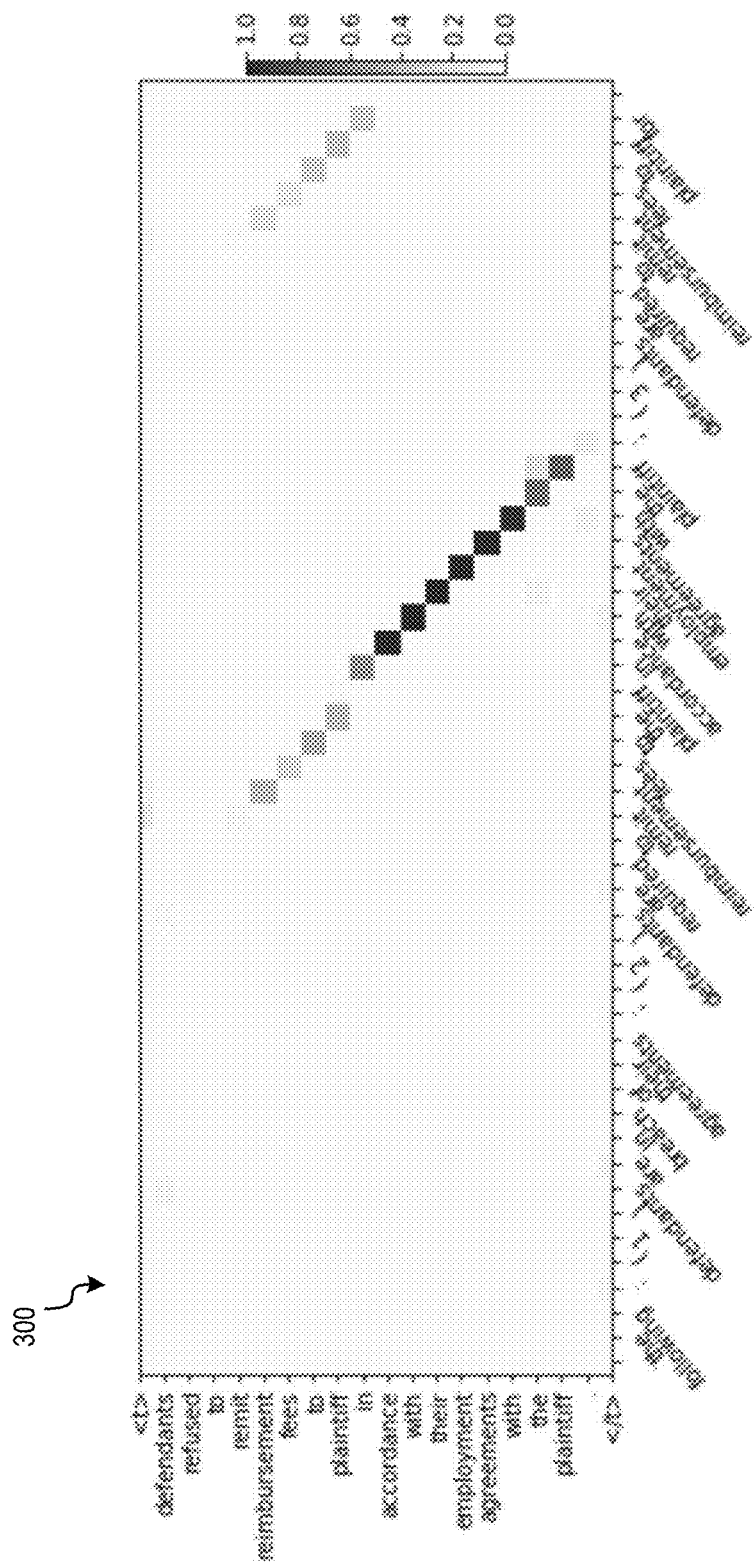
FIG. 3A is a diagram illustrating an example of an attention matrix in accordance with aspects of the present disclosure.

The attention matrix generated by the at least one model may provide an attention score for each token of the source document with respect to each token of the generated summary. In embodiments, a higher attention score for a source token with respect to a generated token indicates a higher relevance or importance of the source token with respect to the generated token in the generated summary when predicting the token in the summary. In this manner, an attention score for a particular token in the source document represents the importance and/or relevance of that particular token when generating the summary. In embodiments, the attention matrix may be a matrix of dimensions A×H, where A represents the number of tokens in the source text, and H represents the number of tokens in the generated summary. FIG. 3A is a diagram illustrating an example of an attention matrix in accordance with aspects of the present disclosure. As shown in FIG. 3A, attention matrix 300 may include A source tokens shown on the horizontal axis, and H summary tokens (e.g., tokens in the generate summary) shown on the vertical axis. An attention score distribution is shown for each source token with respect to each summary token. In this example, the shading level of the attention score indicates the attention score. For example, a higher score may be indicated by a darker shading and may indicated that the associated token is more important when generating the next word in the summary than a lighter shaded score.

In some embodiments, one or more attention scores for each token of the plurality of tokens of the content in the source document may be extracted from the attention matrix. For example, an average of the attention matrix provided by the at least one model may be calculated along one axis of the attention matrix (e.g., the A axis). The results of the averaging includes a 1×A vector representing the averaged attention score per token in the source document with respect to the generated summary.

At block 206, each token of the plurality of tokens is aligned to at least one word of the plurality of words included in the content in the source document. For example, in some embodiments, a token may include a sub-word, rather than an entire word. In these cases, tokens representing sub-words of a word may be combined or merged to form or generate the word. In some aspects, aligning a token representing an entire word may include associating the word with the token. In this manner, each token in the source document is aligned to a word in the source document.

At block 208, attention scores of tokens aligned to each word in the source document are combined to generate an overall attention score for each word in the source document. For example, tokens associated with sub-words of a word may be combined to generate the word, and at block 208 the individual attention scores for each token may also be combined to generate an overall attention score for the word. In this manner, attention scores for entire words of the source document may be obtained, rather than only attention scores for the individual tokens, which may not encompass entire words. In aspects, combining the individual attention scores for each token to generate an overall attention score for a word may include applying smoothing over a window of words before the overall attention score is presented to the user.

At block 210, at least one word of the plurality of words may be displayed with an indication of the overall attention score associated with the at least one word. In embodiments, the indication displayed with the at least one word may be based on the overall attention score associated with the at least one word. For example, in some embodiments, the indication may include a highlighting displayed over the at least one word of the source document. In embodiments, the opacity of the highlighting over the at least one word may be based on the overall attention score of the at least one word, and in this manner, the highlighting over the at least one word may serve to indicate the importance and/or relevance of the at least one word with respect to the generated summary. For example, a darker highlight over a first word of the source document may indicate a higher attention score than a lighter highlight over a second word of the source document. In this manner, a darker highlight over a word may indicate that the word is more important or has more relevance to the generated summary than a word with a lighter highlight (e.g., a darker highlight over a word may indicate that more attention was paid by the at least one model to the highlighted word when predicting a next word in the generated summary than the attention paid to a word with a lighter highlight).

Figure 3B:
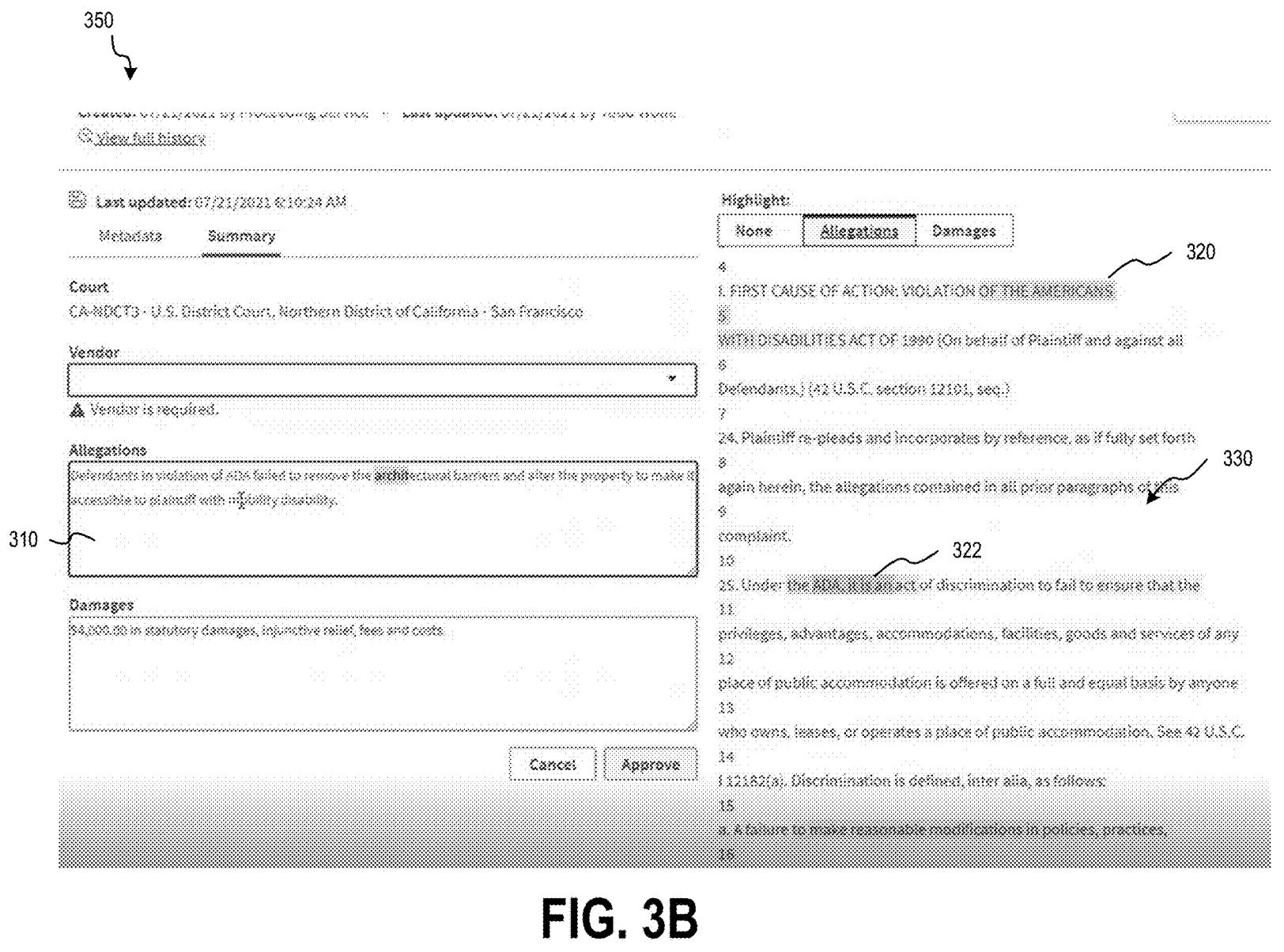

FIG. 3B is a diagram illustrating an example of attention score based highlighting in accordance with embodiments of the present disclosure. As shown in FIG. 3B, GUI 350 is configured to display a generated summary 310 generated based on a summarization model, and to present AI explainability metrics associated with generated summary 310. For example, highlighting is displayed over words of source document 330. The highlighting is shown as varying in opacity. For example, word 320 is shown with a lighter highlighting than word 322. In this manner, word 322 is shown to be more relevant or important when the model generated summary 310. In this manner, a user may very summary 310 by looking the words that the model considered more important when generating the summary. The user may confirm whether the summary is correct or not based on the relevant and/or important words, according to the mode. The user may then determine whether the model may be trusted or whether the model needs improvement. In some embodiments, when the summary 310 is not accurate, the user may correct summary 310, and the correction maybe fed back to the model and the model may learn and refine in order to improve summary generate in subsequent operations.

Figure 3C:
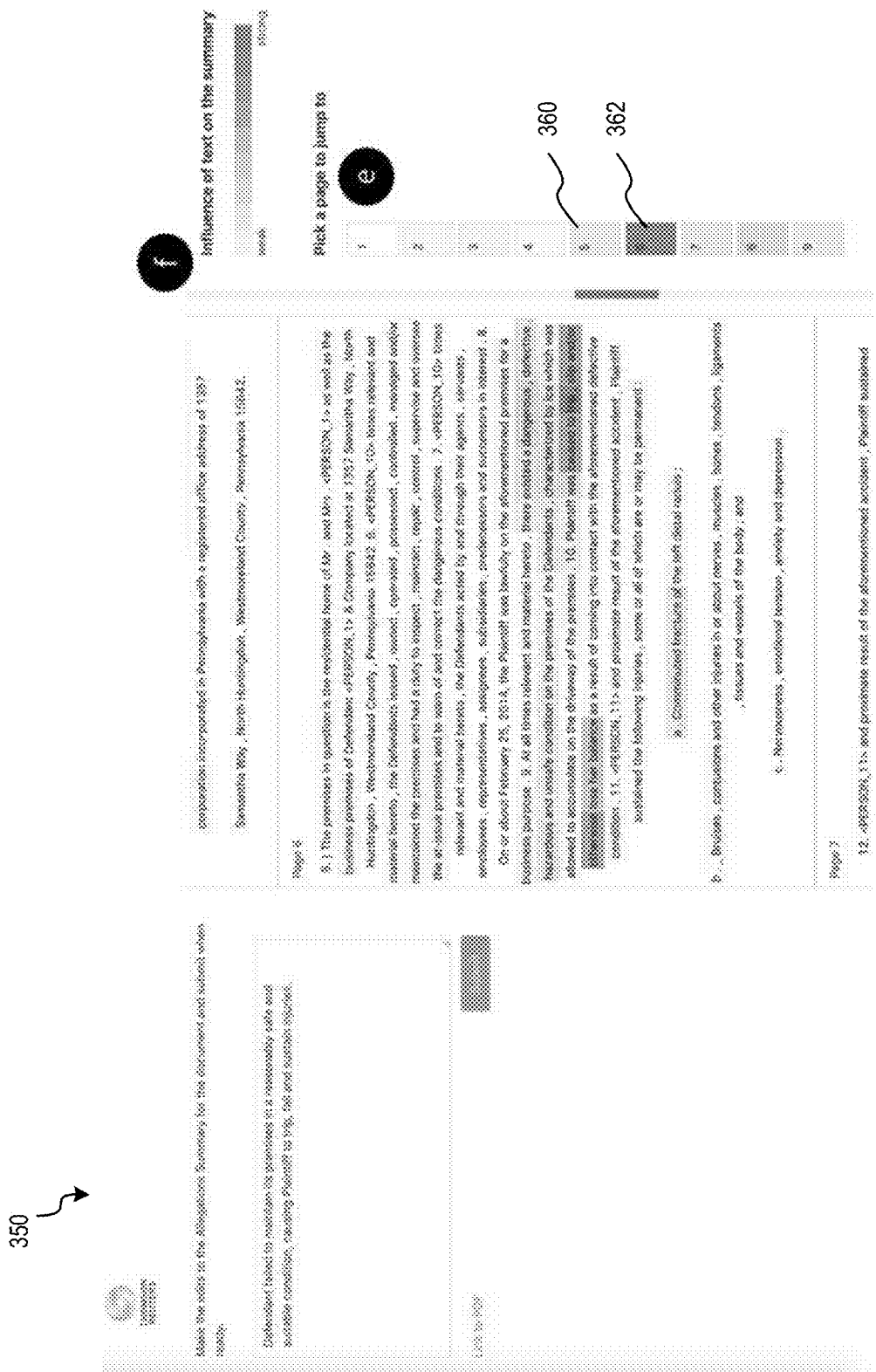
FIG. 3C is a diagram illustrating an example of page-based attention score indication in accordance with embodiments of the present disclosure.

In some aspects, in addition to the word-based attention score indication, a page-based attention score indication may be provided in embodiments of the present disclosure. FIG. 3C is a diagram illustrating an example of page-based attention score indication in accordance with embodiments of the present disclosure. As shown in FIG. 3C, GUI 350 is configured to display a generated summary and associated AI explainability metrics. In addition, GUI 350 may be configured to present page-based attention score indications. For example, GUI 350 may display a representation of the pages of the source document for which the summary was generated. In embodiments, a page attention score may be calculated. For example, for each page of the source document, a page attention score may be determined based on the individual attention scores of each token contained within the page. The page attention score may then me normalized and a highlighting based on the page attention score may be displayed for a given page. For example, page attention score indication 360 may be displayed for page 5 of the source document, and page attention score indication 362 may be displayed for page 6 of the source document. As shown, attention score indication 362 is darker than attention score indication 360 indicating that the average token-based attention score for the tokens within page 6 is greater than the average token-based attention score for the tokens within page 5. This may provide a quick indication to a user that page 6 may be more relevant when the user verifies the summary generate from the source document, as page 6 includes more relevant tokens (e.g., tokens that the model considered mode relevant or important when generating the summary).

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1 and 2 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of displaying attention scores to a user, comprising:
    receiving a source document to be analyzed by at least one model, wherein the source document includes a plurality of tokens, and wherein the at least one model is configured to generate a summary based on content of the source document, and wherein the summary includes a plurality of tokens;
    determining one or more attention scores for each token of the plurality of tokens of the source document with respect to each token of the plurality of tokens of the summary, wherein each attention score of the one or more attention scores indicates a level of relevance of an associated token of the source document to an associated token of the summary generated by the at least one model;
    determining, based on the one or more attention scores, averaged attention scores for each token of the plurality of tokens of the source document with respect to the plurality of tokens of the summary;
    aligning each token of the plurality of tokens of the source document to at least one word of a plurality of words included in the source document;
    combining, for each word of the plurality of words included in the source document, averaged attention scores of tokens aligned to the word to generate an overall attention score for each word of the plurality of words included in the source document; and
    displaying at least one word of the plurality of words included in the source document with an indication of the overall attention score associated with the at least one word, the indication based on the overall attention score.

2. The method of claim 1, wherein each token of a set of tokens of the plurality of tokens included in the source document is associated with a portion of a word of the plurality of words included in the source document, and wherein combining the attention scores of the tokens aligned to the word to generate the overall attention score for each word of the plurality of words included in the source document includes:
    combining individual attention scores associated with each token of the set of tokens to generate the overall attention score for the word of the plurality of words included in the source document.

3. The method of claim 1, wherein the indication of the overall attention score associated with the at least one word of the plurality of words included in the source document includes a highlighting displayed over the at least one word.

4. The method of claim 3, wherein an opacity of the highlighting displayed over the at least one word of the plurality of words included in the source document is based on the overall attention score associated with the at least one word.

5. The method of claim 4, wherein the overall attention score associated with a first word of the at least one word of the plurality of words included in the source document is higher than the overall attention score associated with a second word of the at least one word of the plurality of words included in the source document, and wherein the opacity of the highlighting displayed over the first word is darker than the opacity of the highlighting displayed over the second word.

6. The method of claim 4, wherein the opacity of the highlighting displayed over the at least one word of the plurality of words included in the source document is zero when the overall attention score associated with the at least one word is below a predetermined threshold.

7. The method of claim 1, further comprising:
    combining, for each page of the source document, attention scores of tokens within each respective page of the source document to generate a page attention score for each respective page of the source document; and
    displaying an indication of the page attention score for each respective page of the source document.

8. The method of claim 7, wherein the indication of the page attention score for each respective page of the source document includes a highlighting associated with each respective page with an opacity based on the page attention score for each respective page.

9. The method of claim 1, wherein the at least one model includes one or more summarization models.

10. A system for displaying attention scores to a user, comprising:
    a database configured to store a source document including a plurality of tokens; and
    a server configured to perform operations including:
        receiving the source document;
        applying a model to the source document to generate a summary based on content of the source document, wherein the summary includes a plurality of tokens;
        determining one or more attention scores for each token of the plurality of tokens of the source document with respect to each token of the plurality of tokens of the summary, wherein each attention score of the one or more attention scores indicates a level of relevance of an associated token of the source document to an associated token of the summary generated by the model;
        determining, based on the one or more attention scores, averaged attention scores for each token of the plurality of tokens of the source document with respect to the plurality of tokens of the summary;
        aligning each token of the plurality of tokens of the source document to at least one word of a plurality of words included in the source document; and
        combining, for each word of the plurality of words included in the source document, averaged attention scores of tokens aligned to the word to generate an overall attention score for each word of the plurality of words included in the source document; and
    an input/output device configured to display at least one word of the plurality of words included in the source document with an indication of the overall attention score associated with the at least one word, the indication based on the overall attention score.

11. The system of claim 10, wherein each token of a set of tokens of the plurality of tokens included in the source document is associated with a portion of a word of the plurality of words included in the source document, and wherein combining the attention scores of the tokens aligned to the word to generate the overall attention score for each word of the plurality of words included in the source document includes:

combining individual attention scores associated with each token of the set of tokens to generate the overall attention score for the word of the plurality of words included in the source document.

12. The system of claim 10, wherein the indication of the overall attention score associated with the at least one word of the plurality of words included in the source document includes a highlighting displayed over the at least one word.

13. The system of claim 12, wherein an opacity of the highlighting displayed over the at least one word of the plurality of words included in the source document is based on the overall attention score associated with the at least one word.

14. The system of claim 13, wherein the overall attention score associated with a first word of the at least one word of the plurality of words included in the source document is higher than the overall attention score associated with a second word of the at least one word of the plurality of words included in the source document, and wherein the opacity of the highlighting displayed over the first word is darker than the opacity of the highlighting displayed over the second word.

15. The system of claim 13, wherein the opacity of the highlighting displayed over the at least one word of the plurality of words included in the source document is zero when the overall attention score associated with the at least one word is below a predetermined threshold.

16. The system of claim 10, wherein the server is further configured to perform operations including:
combining, for each page of the source document, attention scores of tokens within each respective page of the source document to generate a page attention score for each respective page of the source document, and wherein the input/output device is further configured to:
display an indication of the page attention score for each respective page of the source document.

17. The system of claim 16, wherein the indication of the page attention score for each respective page of the source document includes a highlighting associated with each respective page with an opacity based on the page attention score for each respective page.

18. The system of claim 10, wherein the model includes one or more summarization models.

19. A computer-based tool for displaying attention scores to a user, the computer-based tool including non-transitory computer readable media having stored thereon computer code which, when executed by a processor, causes a computing device to perform operations comprising:
receiving a source document to be analyzed by at least one model, wherein the source document includes a plurality of tokens, and wherein the at least one model is configured to generate a summary based on content of the source document, and wherein the summary includes a plurality of tokens;
determining one or more attention scores for each token of the plurality of tokens of the source document with respect to each token of the plurality of tokens of the summary, wherein each attention score of the one or more attention scores indicates a level of relevance of an associated token of the source document to an associated token of the summary generated by the at least one model;
determining, based on the one or more attention scores, averaged attention scores for each token of the plurality of tokens of the source document with respect to the plurality of tokens of the summary;
aligning each token of the plurality of tokens of the source document to at least one word of a plurality of words included in the source document;
combining, for each word of the plurality of words included in the source document, averaged attention scores of tokens aligned to the word to generate an overall attention score for each word of the plurality of words included in the source document; and
displaying at least one word of the plurality of words included in the source document with an indication of the overall attention score associated with the at least one word, the indication based on the overall attention score.

20. The computer-based tool of claim 19, wherein the indication of the overall attention score associated with the at least one word of the plurality of words included in the source document includes a highlighting displayed over the at least one word, and wherein an opacity of the highlighting displayed over the at least one word is based on the overall attention score associated with the at least one word.

* * * * *